J. M. GILMAN.
WRENCH.
APPLICATION FILED MAR. 22, 1910.
982,589.
Patented Jan. 24, 1911.
2 SHEETS—SHEET 1.
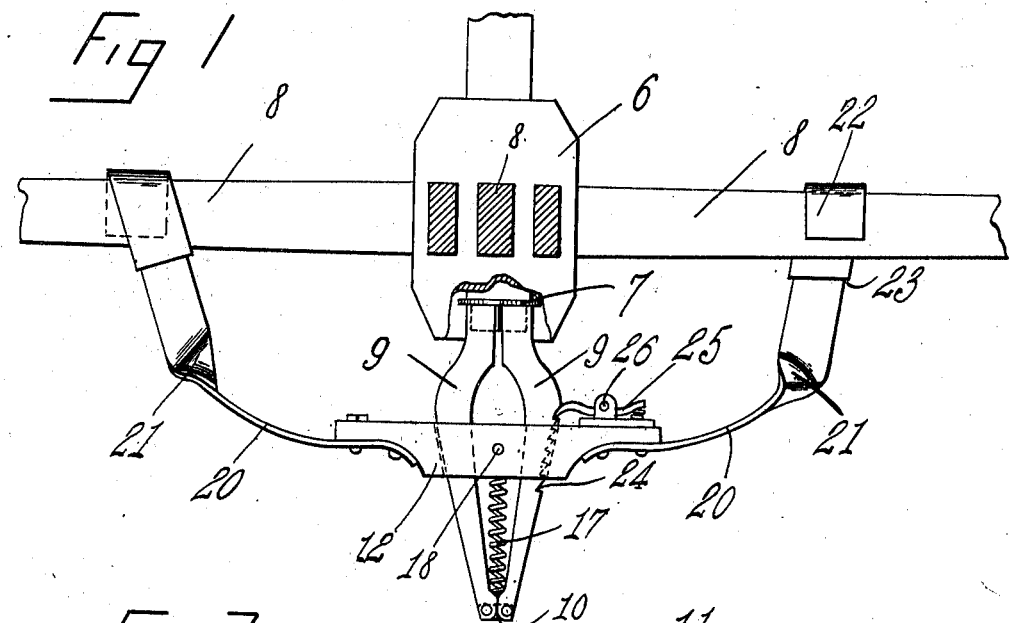
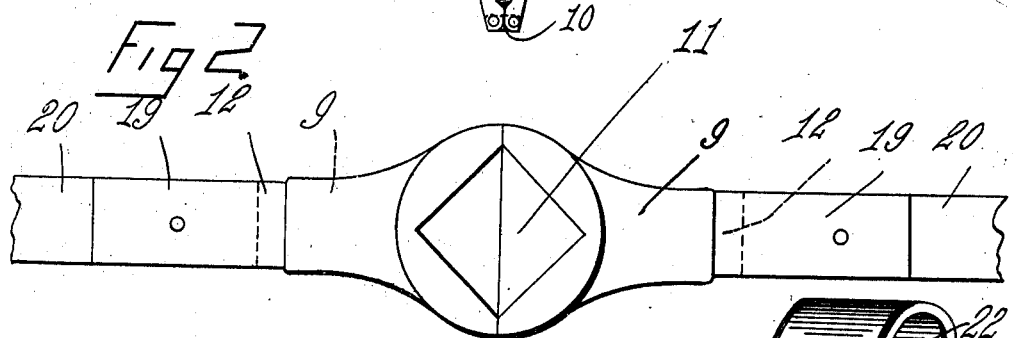
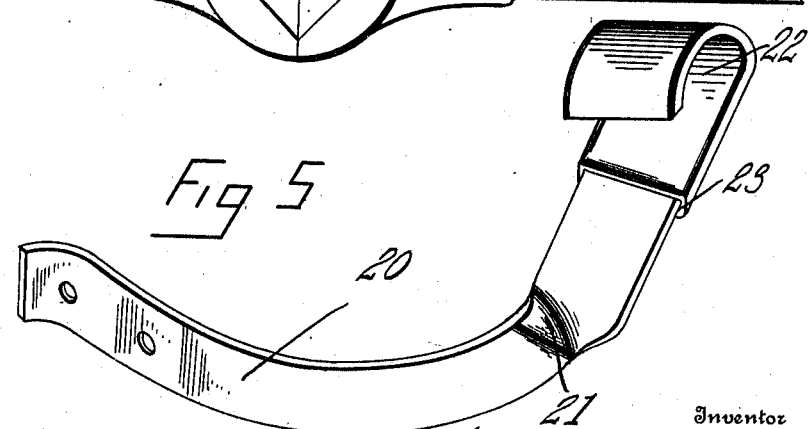
Inventor
Joseph M. Gilman J. M. GILMAN.
WRENCH.
APPLICATION FILED MAR. 22, 1910.
982,589.
Patented Jan. 24, 1911.
2 SHEETS—SHEET 2.
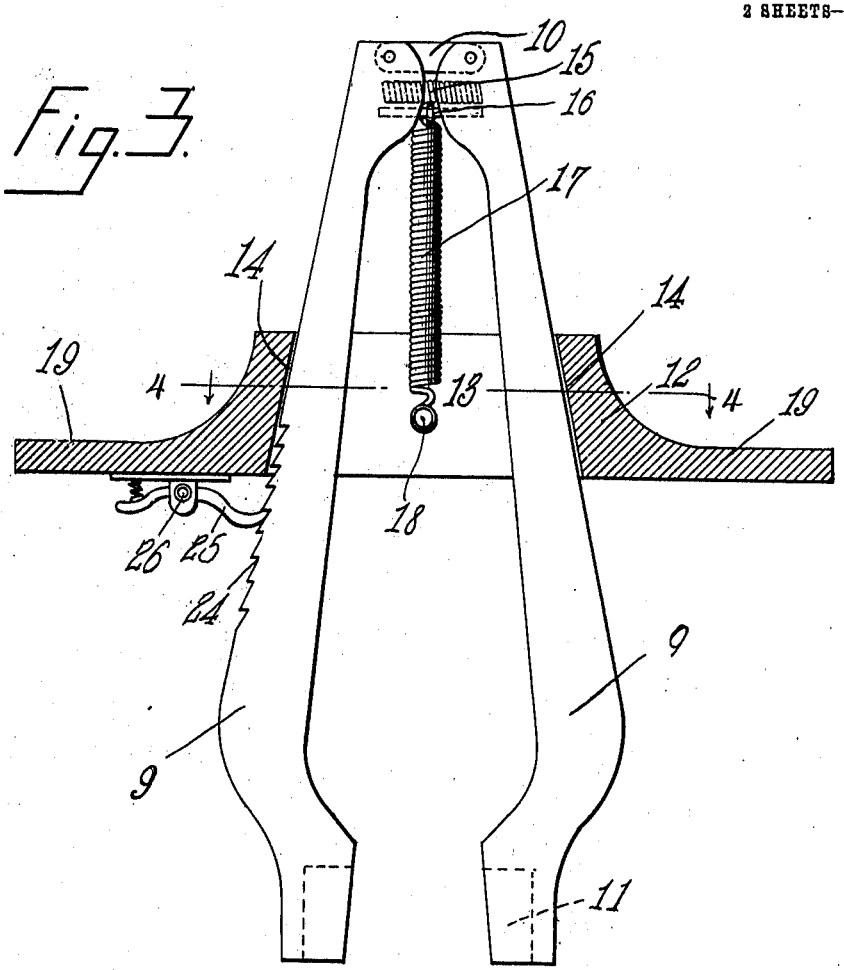
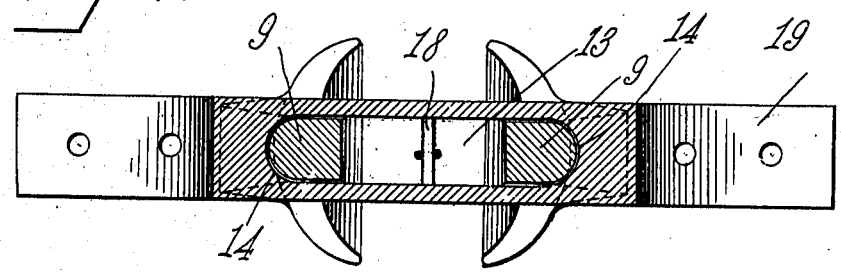
Inventor
Joseph M. Gilman

UNITED STATES PATENT OFFICE.

JOSEPH M. GILMAN, OF LITCHFIELD, MAINE.

WRENCH.

982,589.  Specification of Letters Patent.   Patented Jan. 24, 1911.

Application filed March 22, 1910. Serial No. 550,901.

*To all whom it may concern:*

Be it known that I, JOSEPH M. GILMAN, a citizen of the United States, residing at Litchfield, in the county of Kennebec, State of Maine, have invented certain new and useful Improvements in Wrenches; and I do hereby declare the following to be a full, clear, and exact description of the invention, such as will enable others skilled in the art to which it appertains to make and use the same.

The invention relates to a wrench and more particularly to the class of vehicle wrenches.

The primary object of the invention is the provision of a wrench of this character in which the jaws of the wrench for gripping a nut are conveniently held in a guide member which latter is adapted to be connected to the spokes of a wheel when it is desired to remove a nut from the axle of a vehicle so that it is unnecessary for an operator to handle the nut as the same will be held in the hub of a vehicle wheel when the latter is being removed from the vehicle axle.

Another object of the invention is the provision of a wrench of this character for use in removing axle nuts of vehicles or that may be easily applied to such objects as pipes, rods, bolts and nuts now in ordinary use and is adapted to securely engage therewith so that the same may be operated upon as in the manner of the ordinary wrench.

A further object of the invention is the provision of a wrench of this character which is simple in construction, automatically operated, thoroughly reliable and efficient in operation and inexpensive in the manufacture.

In the drawings accompanying and forming part of this specification is illustrated the preferred form of embodiment of the invention, which to enable those skilled in the art to practice the invention, will be set forth at length in the following description, while the novelty of the invention will be brought out in the claims succeeding the description, it being understood of course that minor changes, variations and modifications may be made, such as come properly within the scope of the appended claims, without departing from the spirit or sacrificing any of the advantages of the invention.

In the drawings:—Figure 1 is a top plan view of the invention as applied to a vehicle wheel for removing an axle nut of a vehicle. Fig. 2 is a fragmentary end elevation of the wrench. Fig. 3 is a sectional view transversely of the wrench. Fig. 4 is a sectional view on the line 4—4 of Fig. 3. Fig. 5 is a detail perspective view of one of the yieldable arms detached from the wrench.

Similar reference characters indicate corresponding parts throughout the several views in the drawings.

In the drawings, the numeral 6 designates generally a vehicle wheel which is of the ordinary or well known construction and is shown merely for the sake of illustration of the manner of connecting or mounting the wrench thereto. This vehicle wheel is connected to an axle as is customary by means of the ordinary or well known axle nut 7, and is provided with radial spokes 8 of usual type.

The wrench comprises jaw members 9, which latter are pivoted or connected together at one end for opening or closing movement by means of a cross connecting link 10, and the opposite end of each jaw is formed with a nut engaging recess 11, so that when the jaws at their free end are brought together the same will grip the nut 7 so that it may be tightened or removed as the occasion may demand.

Slidably mounted upon the jaw members 9, is a cross yoke member 12, which latter is formed with a tapering elongated opening 13, through which pass the jaw members and the tapered opposite walls 14, of this opening 13 frictionally engage the outer longitudinal edges of the jaw members when the yoke member 12, is moved thereon to bring the jaws to open or closed position.

Mounted in suitable registering sockets at the pivoted end of the wrench in the jaw members 9 is an expansion spring 15, which latter serves to spread the jaw members apart at their free engaging or gripping ends upon moving the yoke member 12, toward the pivoted end of the wrench.

Loosely mounted in the jaw members 9 near their pivoted ends is a pin 16, to which is connected one end of a coiled retractile spring 17, the opposite end of which is connected to a pin 18 mounted centrally in the yoke member 12 and passing transversely through the opening 13 therein. This retractile spring 17, acts to hold the yoke member 12, in a position to allow the jaw members 9, to assume a normal open position to permit the wrench to freely engage a nut to be operated upon thereby.

Fixed to opposite reduced extremities 19 of the yoke member 12 are the inner ends of yieldable strap arms 20, the same being twisted intermediate of their ends as at 21, to permit their outer extremities to properly engage a pair of the spokes 8 and these outer extremities are formed with hook terminals 22, provided with a resilient covering 23, such as rubber or cork, the hook terminals being adapted to engage the spokes 8 of the wheel for the mounting of the wrench thereon and in position to engage the axle nut.

One jaw member at its outer longitudinal edge is formed with forwardly directed rack teeth 24, which latter are engaged by a locking pawl 25, pivoted as at 26, upon one face of the yoke member to lock the latter in shifted position upon the jaw members against the action of the retractile spring 17, so as to lock the jaws in closed position when engaging a nut.

In operation and to mount the wrench upon a vehicle wheel so that it will grip the axle nut the yieldable arms 20, are brought into a position to have their hook terminals 22, engage the opposite alining spokes 8 of the wheel and by an operator exerting an outward pull on the yoke member 12, it will permit the open jaws 9, of the wrench to assume the proper position for automatic gripping of the nut 7, upon freeing the yoke member 12, and then upon rotating the wheel in one direction or the other the nut 7, may be tightened upon the axle or removed therefrom.

It will be stated that the yieldable arms 20 may be detached at the will of an operator from the yoke member 12, so that the wrench can be used as an ordinary wrench.

What is claimed is:—

1. A wrench of the class described comprising pivotal jaw members, a yoke piece slidably mounted upon the jaw members and adapted to close the same when moved in one direction thereon, means acting upon the jaw members to automatically spread the same apart when the yoke piece is moved in one direction, retractile means having connection with the jaw members and yoke piece to hold the latter in normal inoperative position, and yieldable arms fixed to the yoke piece and having hook terminals for detachable connection with the spokes of a vehicle wheel.

2. A wrench of the class described comprising pivotal jaw members, a yoke piece slidably mounted upon the jaw members and adapted to close the same when moved in one direction thereon, means acting upon the jaw members to automatically spread the same apart when the yoke piece is moved in one direction retractile means having connection with the jaw members and yoke piece to hold the latter in normal inoperative position, yieldable arms fixed to the yoke piece and having hook terminals for detachable connection with the spokes of a vehicle wheel, and locking means carried by the yoke piece and adapted to engage one of the jaw members to hold the jaw members in closed position upon movement of the yoke piece in one direction thereon.

In testimony whereof, I affix my signature, in presence of two witnesses.

JOSEPH M. GILMAN.

Witnesses:
 H. MABEL COBB,
 LIZZIE J. CLASON.